United States Patent Office

3,692,562
Patented Sept. 19, 1972

3,692,562
COATED TABLETS HAVING PLASTIC PARTICLES DISPERSED IN THE COATING
Ryuichi Kawata, 16–12 Sendagi, Sendagi 3-chome, Bunkyo-ku, Tokyo, Japan; Hiroitsu Kawada, 30–29–22 Hasune 2-chome, Itabashi-ku, Tokyo, Japan; Tadayoshi Ohmura, 2681–101 Katayamanaka-dori, Niiza-machi, Kitaadachi-gun, Saitama, Japan; Sumio Uematsu, 440 oaza-Tazima, Urawi-shi, Saitama, Japan; and Takeshi Kohinata, 16–1 Hasune 3-chome, Itabashi-ku, Tokyo, Japan
No Drawing. Filed Nov. 17, 1970, Ser. No. 90,429
Claims priority, application Japan, Dec. 2, 1969, 44/96,243
Int. Cl. A61k 17/00; B44d 5/00
U.S. Cl. 117—100 A                    10 Claims

ABSTRACT OF THE DISCLOSURE

Tablets are coated with a coating composition comprising a coating material and fine particles of a solid plastic.

DETAILED EXPLANATION OF THE INVENTION

The present invention relates to a method of coating tablets with a coating composition containing a coating material and fine particles of a solid plastic.

More particularly, the invention relates to a method of coating tablets with a coating composition comprising a coating composition or a base and 0.1–30% based on the coating material of fine particles of a plastic material, such as nylon, polytetrafluoroethylene, polyethylene, polypropylene, having a diameter of less than 50 microns.

In the oral administration of medicaments and particularly tablets, it is generally important to provide an elegant appearance to the tablets. Additionally, it is also important that the tablets should be characterized by a highly acceptable taste. Still further, the tablets should be stable that is, they should be able to withstand high temperature and humidity without loss of activity.

To solve the above-mentioned problems, the surfaces of tablets containing medicaments are coated with sub-coatings, sugar coatings or film coatings by applying to the surfaces of the tablets an aqueous or organic solvent solution of sugar, gelatin, shellac or cellulose acetate phthalate containing, if necessary, a shielding agent, a coloring agent, a lubricant, a filler, etc. However, such a conventional coating operation requires great skill. Even if the coating operation is taken care of by skilled persons with the utmost care, satisfactory tablets have not been obtained. For example, these tablets are characterized by uneven coloring; the coated layers may develop cracks during storage; the medicaments may exude during storage; the coloring may fade and more importantly, the disintegration time of the tablets may be delayed.

An object of this invention is to form on the surface of tablets beautiful coatings having improved durability to high temperature and high humidity by a simple manner by using a coating composition having a simple composition.

Another object of this invention is to provide coated tablets which have uniform color and do not fade.

Still another object of this invention is to provide a coating composition capable of forming coatings having high resistance to atmospheric conditions by a film coating method of this invention.

The inventors have investigated the manner of producing coated tablets using a coating composition having a simple composition and a simple coating operation which can be handled even by unskilled persons and it has now been discovered that the above-mentioned objects of this invention can be attained by using the aforesaid coating composition.

The use of fine particles of a solid plastic material in the coating composition for tablets was not known. Also it had not been expected that quite advantageous results can be obtained by the incorporation of fine particles of a solid plastic material in the coating composition.

There are many kinds of fine particles of solid plastic material which can be used in this invention. For example, any materials which can be finely pulverized and are insoluble in a solvent for the coating material, such as water, alcohols, acetone and ethyl acetate may be used. Typical examples of these are nylon, polytetrafluoroethylene, polyethylene, polypropylene, organosilicone oxide polymer, polyvinyl chloride, polymethylmethacrylate and the like.

The diameters of the fine plastic materials are generally less than 50 microns, preferably 1–10 microns.

As a suitable coating material or base, there can be used sucrose for sugar coating and gelatin, shellac, polyethylene glycol, cellulose acetate phthalate, etc., for film coating.

The coating composition of this invention may be prepared by dispersing in a solvent the coating material and the fine particles of the solid plastic in a proportion of 0.1–30% preferably 0.1–10% of the coating material. As the solvent for the coating composition, water or an organic solvent such as an alcohol, acetone, and ethyl acetate may be used according to the nature of the coating material to be employed. In addition, if the medicaments contained in the tablets are unstable to water, solvents other than water are, as a matter of course, preferably used.

To the coating composition of this invention may be desirably added a coloring agent, a taste improving agent, a flavouring agent, a lubricant, a filler, a shielding agent, etc. Furthermore, titanium oxide has hitherto been used as a shielding agent but since titanium oxide is an inferior dispersing agent, the use of a surface active agent is desirable when using titanium oxide. However, the fine particles of plastic material act sufficiently as a shielding agent and thus even in the case where the use of an additional sheilding agent is required, as in a conventional case, the purpose therefor can be attained by using the coating composition of this invention without using an adidtional shielding agent. Moreover, if it is required to use such a conventional shielding agent together with the coating composition of this invention, the use of a surface active agent is unnecessary since the coating composition of this invention is characterized by good dispersibility. Also, where a coloring agent is used. it is preferable to use the fine particles of, e.g., nylon initially dyed by an acid dye and thus the coated tablets have a distinct color and a high fading resistance, which are not accompanied by uneven coloring and oozing of colors.

In order to coat tablets with the coating composition of this invention, the tablets may be immersed in the coating composition and withdrawn followed by drying or may be coated with the coating composition by a conventional manner using a coating pan.

The shape of the tablets to which the coating composition of this invention is applicable may be in disc form, doughnut form, pillar form, spherical form, granular form, or spindle form.

The main component contained in these tablets may be medicaments or foods and such tablets may be prepared by conventional procedures.

The coated tablets obtained by the present invention have a high impact resistance, high durability to the variation of temperature and humidity, and do not cause oozing or exudation of the components contained in the tablets.

Therefore, the invention is particularly suitable for preparing coated tablets containing unstable medicaments therein. The coated tablets provided by this invention are not characterized by color oozing or uneven coloring. Furthermore, when the coated tablets are stored over an extended period of time, the disintegration time of the tablets is not delayed.

Also, the coatings obtained by the invention are not only more beautiful but possess better luster than conventional coating. Further, the difficulty regarding the undesirable appearance of coatings which is one of the objections characterizing conventional film coating can be overcome by using the coating composition of this invention.

Now, the invention will further be described by referring to the following examples although the invention is not limited to them.

EXAMPLE 1

|  | G. |
|---|---|
| Cellulose acetate phthalate | 100 |
| Fine particles of nylon | 10 |
| Acetone | 430 |
| Isopropyl alcohol | 430 |

In a mixture of acetone and isopropyl alcohol was dissolved cellulose acetate phthalate and then the fine particles of nylon (S P powder, made by Poyo Rayon Co.) were uniformly dispersed in the solution thus obtained to provide the coating composition.

In a coating pan were placed 10,000 tablets each being 150 mg. in weight and while rotating the coating pan, 10 g. of the coating composition prepared above was uniformly sprayed over the surfaces of the tablets. The tablets were, thereafter, dried by a warm blast of air of about 50° C. By repeating the same procedure, the coated tablets each being 160 mg. in weight were prepared.

EXAMPLE 2

|  | G. |
|---|---|
| Hydroxypropyl methyl cellulose | 50 |
| Fine particles of colored nylon | 5 |
| Methylene chloride | 400 |
| Methanol | 400 |
| 2-Ethoxy ethanol | 100 |

After disolving hydroxypropyl methyl cellulose in a mixed solvent of methylene chloride, methanol and 2-ethoxy ethanol, the fine particles of nylon dyed by a food red dye #3 were uniformly dispersed in the resultant solution to provide the coating composition. In the same manner as Example 1, the coated tablets each being 160 mg. in weight were obtained.

EXAMPLE 3

|  | G. |
|---|---|
| Hydroxypropyl cellulose | 100 |
| Fine particles of polytertafluoroethylene | 10 |
| Methanol | 400 |
| Isopropyl alcohol | 400 |

After dissolving hydroxypropyl cellulose in a mixed solvent of methanol and isopropyl alcohol, the fine particles of polytraufloroethylene were uniformly dispersed in the resultant solution to provide the coating composition. In the same manner as Example 1, the coated tablets each being 160 g. in weight were obtained.

EXAMPLE 4

|  | G. |
|---|---|
| Sucrose | 650 |
| Gelatin | 15 |
| Fine particles of nylon | 30 |
| Food yellow dye #4 | 1 |
| Water | 300 |

After dissolving gelatin and then sucrose in warm water at about 80° C. with stirring, the fine particles of nylon were uniformly dispersed in the resultant solution and futher the food yellow dye #4 was added thereto to provide the coating composition.

In a coating pan were placed 10,000 tablets each being 150 mg. in weight and after heating the tablets with a warm blast of air 30 g. of the coating composition was sprayed over the tablets each time while rotating the pan and then the coated tablets were dried with a warm blast of air at about 50° C.

By repeating the same procedure, coated tablets each being 200 mg. in weight were prepared.

Coated tablets (I) prepared by using the coating composition of this invention and control coated tablets (II) prepared by using a coating composition having the same composition as the coating composition of this invention except that the fine particles of nylon were omitted, were placed in a chamber at a constant temperature of 70° C. The tablets (II) cracked at the coatings after 8 hours, while no cracks were formed at the coatings of the tablets (I) and there was no change in appearance even after 3 weeks.

EXAMPLE 5

|  | G. |
|---|---|
| Sucrose | 450 |
| Fine particles of nylon | 20 |
| Talc | 100 |
| Kaolin | 50 |
| Gum arabic powder | 10 |
| Polyethylene glycol 6000 | 10 |
| Water | 300 |

After dissolving gelatin, sucrose, gum arabic powder and then polyethylene glycol 6000 in warm water at about 80° C. with stirring, fine particles of nylon, talc and kaolin were uniformly dispersed in the resultant solution to provide the coating composition. In the same manner as Example 4, the coated tablets each being 200 mg. in weight were obtained.

EXAMPLE 6

|  | G. |
|---|---|
| Sucrose | 650 |
| Fine particles of polytetrafluoroethylene | 30 |
| Precipitated calcium carbonate | 100 |
| Gelatin | 10 |
| Gum arabic powder | 10 |
| Water | 300 |

After dissolving gelatin, sucrose and then gum arabic powder in warm water at about 60° C., the fine particles of polytetrafluoroethylene and precipitated calcium carbonate uniformly dispersed in the resultant solution to provide the coating composition. In the same manner as Example 4, the coated tablets each being 200 mg. in weight were obtained.

EXAMPLE 7

|  | G. |
|---|---|
| Sucrose | 650 |
| Fine particles of polyethylene | 30 |
| Polyoxyethylene ($n=20$) sorbitane monooleate | 1 |
| Talc | 100 |
| Gelatin | 10 |
| Gum arabic powder | 10 |
| Water | 300 |

($n$ represents the mean polymerization degree of ethylene oxide).

After dissolving sucrose, polyoxyethylene ($n=20$) sorbitane monooleate (Tween-80) and then gum arabic powder in warm water at about 70° C., the fine particles of polyethylene and talc were uniformly dispersed in the resultant solution to provide the coating composition. In the same manner as Example 4, the coated tablets each being 200 mg. in weight were obtained.

EXAMPLE 8

| | G. |
|---|---|
| Gelatin | 1000 |
| Glycerin | 50 |
| Fine particles of nylon | 100 |
| Titanium oxide | 10 |
| Food yellow dye #5 | 2.5 |
| Water | 1000 |

Gelatin was dissolved in warm water at about 80° C. with stirring. A mixture prepared by adding the fine particles of nylon and titanium oxide in glycerin was uniformly dispersed in the solution prepared above and then a solution of the food yellow dye #5 dissolved in a small amount of water was also uniformly mixed with the dispersion prepared above.

The uniform coating composition thus prepared was applied to the surface of a flat sheet and cooled to provide a coating film. Two of such coating films were prepared and between the two films were inserted tablets and the assembly was pressed.

We claim:

1. A stabilized tablet coated with a coating composition comprising a coating material, said coating material having dispersed therein 0.1–30% by weight based on said coating material of fine particles of at least one plastic material selected from the group consisting of nylon polytetrafluoroethylene, polyethylene, polypropylene, polyvinylchloride, polymethylmethacrylate, and organosilicone oxide polymer, said fine particles having diameters of less than 50 microns.

2. A tablet as claimed in claim 1 wherein said coating material is cellulose acetate phthalate and said plastic material is nylon.

3. A tablet as claimed in claim 1 wherein said coating material is hydroxypropylmethyl cellulose and said plastic material is nylon.

4. A tabet as claimed in claim 1 wherein said coating material is hydroxypropyl cellulose and said plastic material is polytetrafluoroethylene.

5. A tablet as claimed in claim 1 wherein said coating material is sucrose and said plastic material is nylon.

6. A tablet as claimed in claim 1 wherein said coating material is sucrose and said plastic material is polytetrafluoroethylene.

7. A tablet a sclaimed in claim 1 wherein said coating material is sucrose and said plastic material is polyethylene.

8. A tablet as claimed in claim 1 wherein said coating material is gelatin and said plastic material is nylon.

9. A tablet as claimed in claim 1 wherein the solid plastic material is present in an amount ranging between 0.1 and 10%.

10. A tablet as claimed in claim 1 wherein the fine particles have diameters varying between 1 and 10 microns.

References Cited

UNITED STATES PATENTS

| | | | |
|---|---|---|---|
| 3,395,213 | 7/1968 | Rieckmann et al. | 424—32 |
| 3,096,248 | 7/1963 | Rudzki | 424—35 |
| 2,943,926 | 7/1960 | Goepfert | 117—33 X |
| 3,013,942 | 12/1961 | Celmer | 424—37 |
| 3,041,243 | 6/1962 | Sugimoto et al. | 117—100 X |
| 3,185,625 | 5/1965 | Brown | 424—35 |
| 3,456,050 | 7/1969 | Rieckmann et al. | 117—165 |
| 3,480,468 | 11/1069 | Carletti et al. | 117—100 X |
| 3,554,767 | 1/1971 | Daum et al. | 117—165 X |

FOREIGN PATENTS

| | | | |
|---|---|---|---|
| 45/12,756 | 8/1967 | Japan | 424—32 |

WILLIAM D. MARTIN, Primary Examiner

M. R. P. PERRONE, Jr., Assistant Examiner

U.S. Cl. X.R.

117—161 C, 165; 424—32, 33, 35, 37